INVENTORS
Herbert Belar &
Harry F. Olson

Attorney

INVENTORS
Herbert Belar &
BY Harry F. Olson
ATTORNEY

United States Patent Office 3,172,954
Patented Mar. 9, 1965

3,172,954
ACOUSTIC APPARATUS
Herbert Belar, Palmyra, and Harry F. Olson, Princeton, N.J., assignors to Radio Corporation of America, a corporation of Delaware
Filed Dec. 17, 1959, Ser. No. 860,229
19 Claims. (Cl. 179—1)

The present invention relates to acoustic apparatus and, more particularly to apparatus for analyzing speech and other sounds.

The invention is especially suitable for use in voice operated apparatus for deriving signals for controlling the operation of a machine which types or prints the words spoken into the apparatus. Such apparatus will be referred to hereinafter as a "phonetic typewriter." The invention is also suitable for use in apparatus for encoding and decoding sounds, such as spoken words, so that these sounds can be transmitted in the form of some coded representation, such as a digital code. Since speech can be transmitted in the form of digital codes over a more limited bandwidth than would be the case with conventional modulation techniques, the present invention is also generally useful in communication apparatus.

It has been found that sounds can be analyzed in terms of their formants. Formants are different frequency regions where sound is more intense than elsewhere in the spectrum. Formants may be determined from sound amplitude (energy) and frequency components and by the manner in which these components vary with time. An article by the present inventors appearing in the Journal of the Acoustical Society of America, vol. 28, No. 6, November 1956, describes a phonetic typewriter having means for determining syllables of spoken sound by resolving the sound into its frequency and amplitude components and analyzing these components at discrete times during the sounding of a syllable.

It is important for accuracy of analysis of sounds to determine the various formant frequencies of the sound with a high degree of selectivity. For example, a speech syllable can be identified by three formant frequencies. Since information necessary to sound analysis includes an analysis of the amplitude of the sounds, it is equally important to preserve the essential amplitude characteristics of the sounds. However, the amplitude level of sounds, and particularly speech, may vary over wide limits. Thus, amplitude compressors have been used to maintain an arbitrary or normalized amplitude level over a wide range of the input amplitude levels. Such amplitude compression eliminates the information contained in the loudness of sounds.

The frequency components of sound are conventionally determined with a plurality of frequency selective networks. The formant frequencies are determined as those components which exceed an arbitrary amplitude level. To provide a high degree of selection, each of the networks covers a narrow frequency band and is highly selective so as to discriminate against other frequency components lying outside of the band. Nevertheless, such arbitrary determination of the formant frequencies necessarily disregards the amplitude (intensity) relationships among the frequency components of the sound. Such relationships are used in accordance with the present invention to accurately determine the formant frequencies. As a result of the use of these amplitude relationships among the frequency components of the sound, the invention provides an effectively high degree of frequency selection while, at the same time, preserving the information in the loud passages of the input sounds.

In the course of normal speech, the rate of speaking may vary over wide limits. Thus, the same syllable may be spoken during different periods of time. Since the analysis of sounds involves determination of the characteristics of its frequency and amplitude components at discrete times, a proper program of time intervals is necessary to the accuracy of the analysis. It is a feature of the present invention to provide different programs of time intervals for the same sounds spoken at different rates so that the same amplitude-frequency-time characteristics may be derived for the same sounds.

In speech, the same syllables may be spoken either as a whisper or as a shout. Thus, the sound energy available for analysis may be insufficient to actuate the analyzing system. Alternatively, the sound energy available for analysis may be excessive so as to overload the analyzing system. It is desirable to adjust the amplitude range of sound passages and syllables prior to analysis without, however, distorting the sound and disarranging the characteristic formant frequencies thereof.

It is a further feature of the present invention to prepare speech syllables and other like sounds for analysis by adjusting and equalizing their amplitudes without distorting any of their essential characteristics.

The primary object of the present invention is to provide improved apparatus for analyzing sounds, and particularly the sounds of speech.

It is a further object of the present invention to provide improved apparatus for determining the formants of sounds.

It is a still further object of the present invention to provide improved apparatus for determining the frequency-amplitude-time characteristics of sounds with a high degree of accuracy.

It is a still further object of the present invention to provide improved apparatus for analyzing the sounds of speech and other sounds which apparatus produces control signals for actuating a machine which prints or otherwise transmits the spoken sounds.

It is a still further object of the present invention to provide an improved phonetic typewriter.

It is a still further object of the present invention to provide improved sound analysis apparatus in which amplitude information of the character of sound is preserved.

It is a still further object of the present invention to provide improved sound analysis apparatus for analyzing the frequency components of sound which provides a highly effective degree of frequency selectivity.

It is a still further object of the present invention to provide improved speech analysis apparatus which compensates for the effects of the rate of speaking.

It is a still further object of the present invention to provide improved sound analysis apparatus which adjusts the amplitudes of sound passages, such as syllables which are to be analyzed, without distorting the amplitude characteristics thereof.

Briefly described, the present invention includes a combination of improved means for analyzing sound in terms of the amplitude-frequency-time characteristics thereof. Means are provided for analyzing sound in terms of frequency and amplitude, such means being operative to separate the sound into a plurality of components of different frequencies each of which may vary in amplitude. These components are analyzed collectively in order to derive the amplitude characteristics thereof. Thus, in accordance with the invention, means are provided for comparing those components which are adjacent to each other in frequency and for selecting certain components which correspond to peaks in the frequency-amplitude spectrum of the sound. The location and relationships among such peaks have been found to be indicative of the nature of the sound. Amplitude and frequency characteristics are determined in terms of time by means for detecting the selected frequency components at discrete times.

A pre-analyzer is provided which determines the time required to complete the sounding of a passage or syllable. Timing control means in the pre-analyzer operates to establish a program of discrete times during which the selected frequency components are determined. Magnetic recording and reproducing or other sound delay means are provided so that the sound may be stored while the program of discrete times is being established by the pre-analyzer and prior to frequency-amplitude analysis.

Means may be provided for adjusting the amplitudes of the various sound passages and syllables prior to analysis. Sound amplitude detecting means may be included in the pre-analyzer which obtains signals for controlling amplitude adjusting means while the sound passage is being delayed, as by being recorded and later reproduced. The amplitude adjusting means is connected ahead of the sound analyzing means. The amplitude detecting means is operative to control the amplitude adjusting means during the analysis of the sound passage so as to make the amplitudes of all of the passages equal to a certain or predetermined amplitude consistant with the amplitude range of operation of the analyzing means. For example, the peak amplitude of each passage may be adjusted by the adjusting means to be equal to a certain standard amplitude.

A memory, termed a spectral memory, is provided in which information as to selected frequency components is stored at each of the discrete times. The information in the spectral memory is transferred to another memory for storing different syllables or sounds in accordance with code representations. A printer or other means for transcribing or for transmitting the syllables, words or other symbols corresponding to these codes is operated in response to the information in the syllable memory.

The invention itself, both as to its organization and method of operation, as well as the foregoing and other objects and advantages thereof, will become more readily apparent from a reading of the following description in connection with the accompanying drawings in which.

Figure 1:
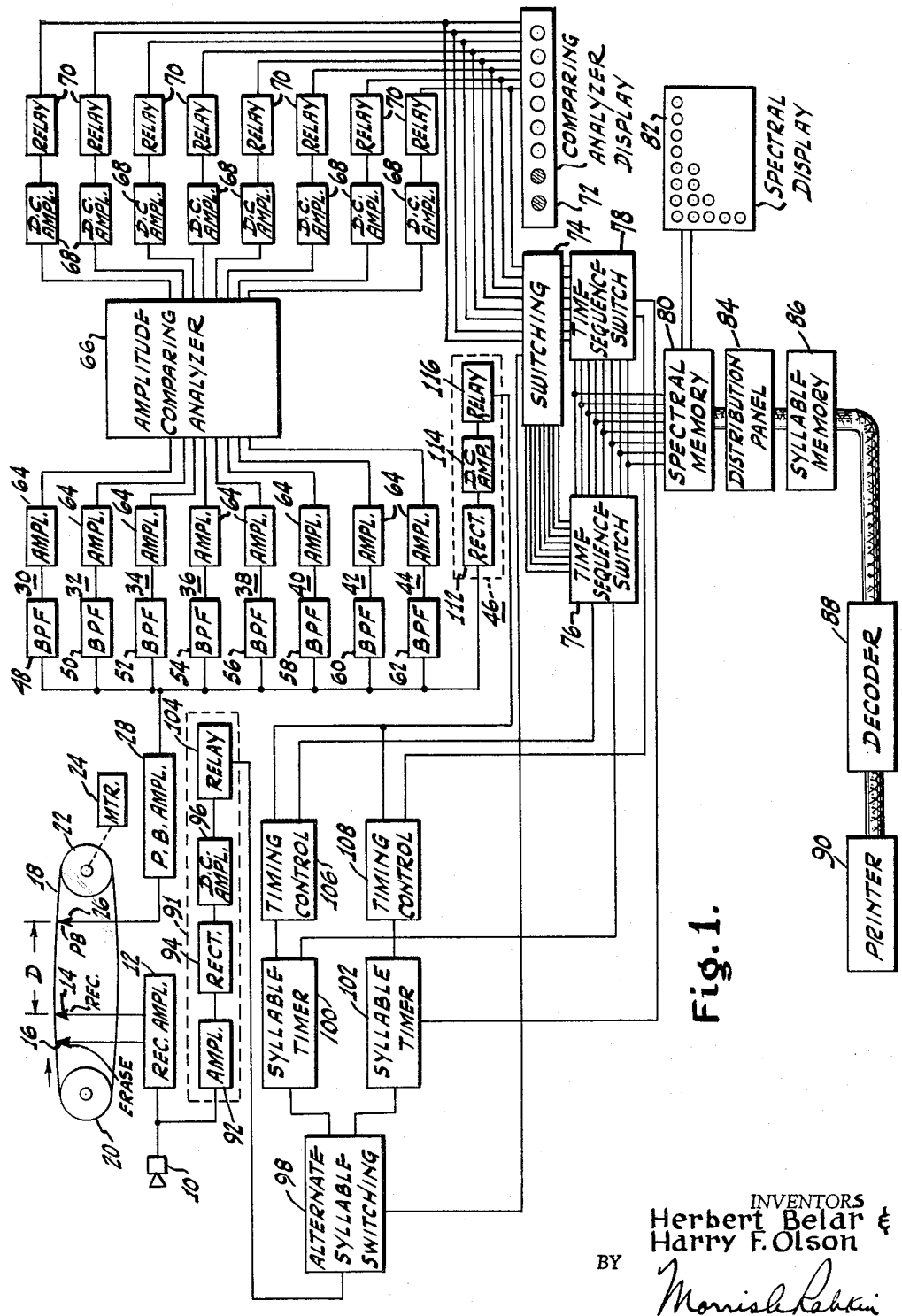
FIG. 1 is a schematic, block diagram of a system for analyzing the sound of speech syllables or the like in accordance with the present invention.
Figure 2:
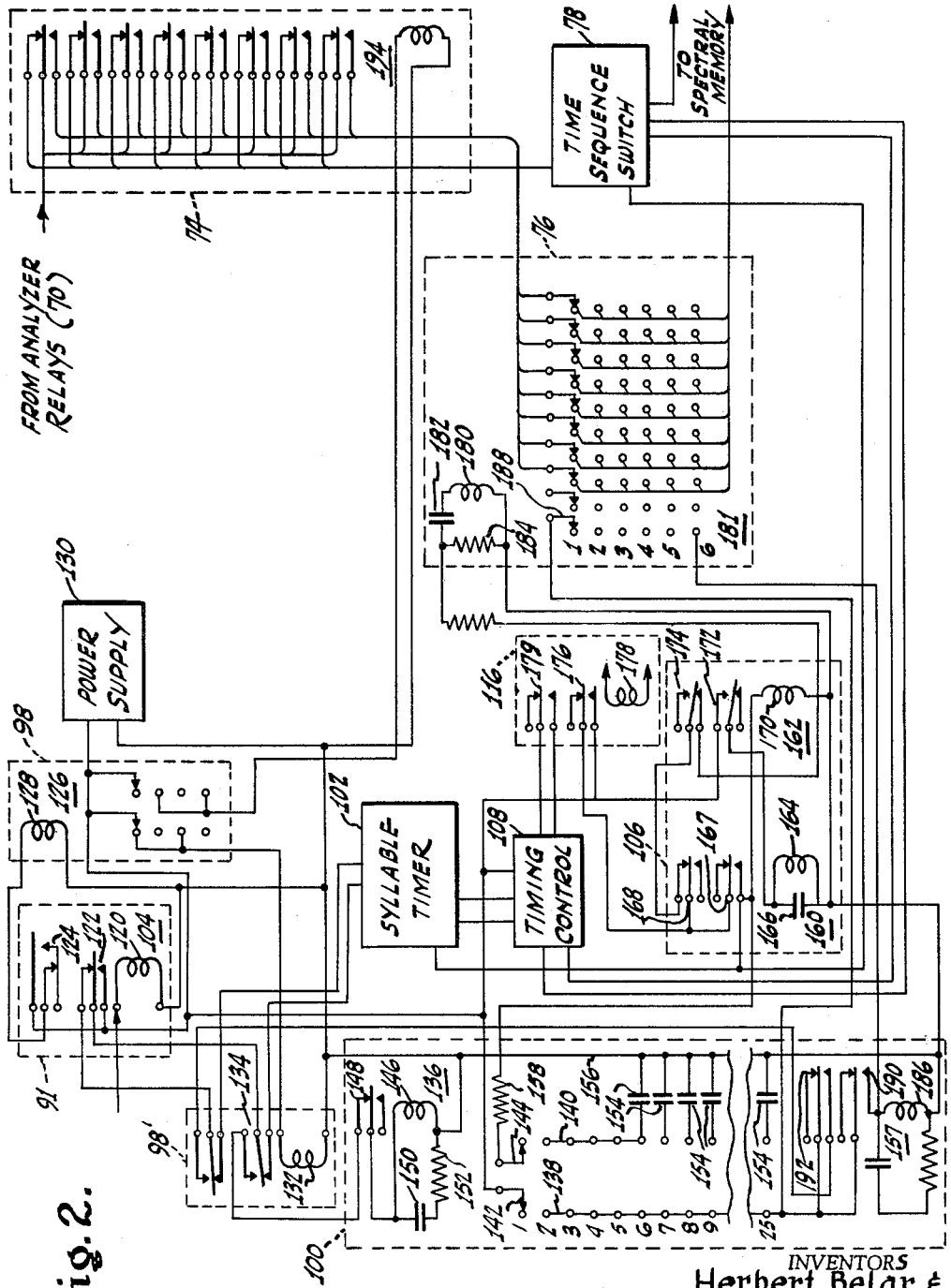
FIG. 2 is a schematic, partially block diagram showing a timing control for establishing a program of discrete times at which the components of sound may be determined.
Figure 7:
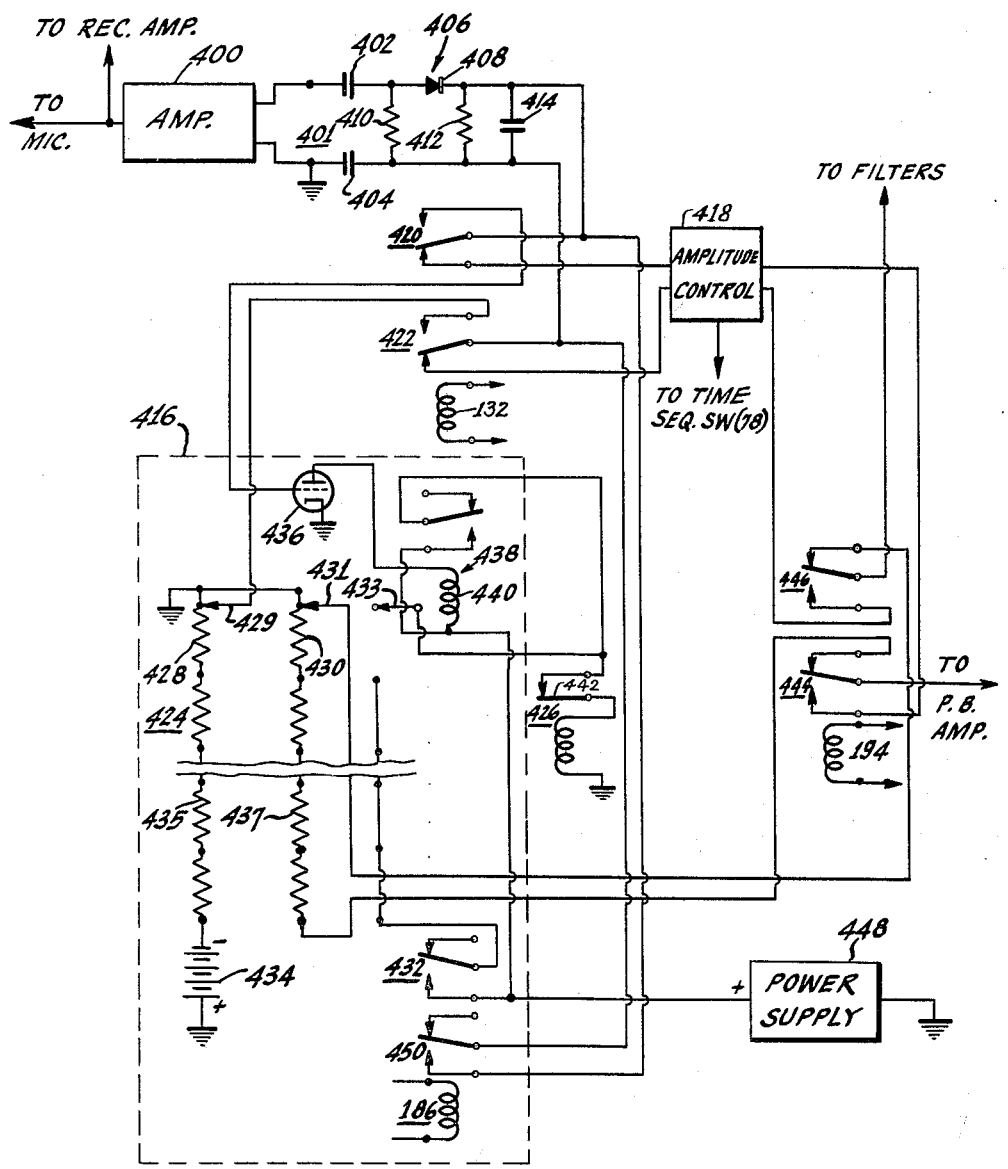
Figure 8:
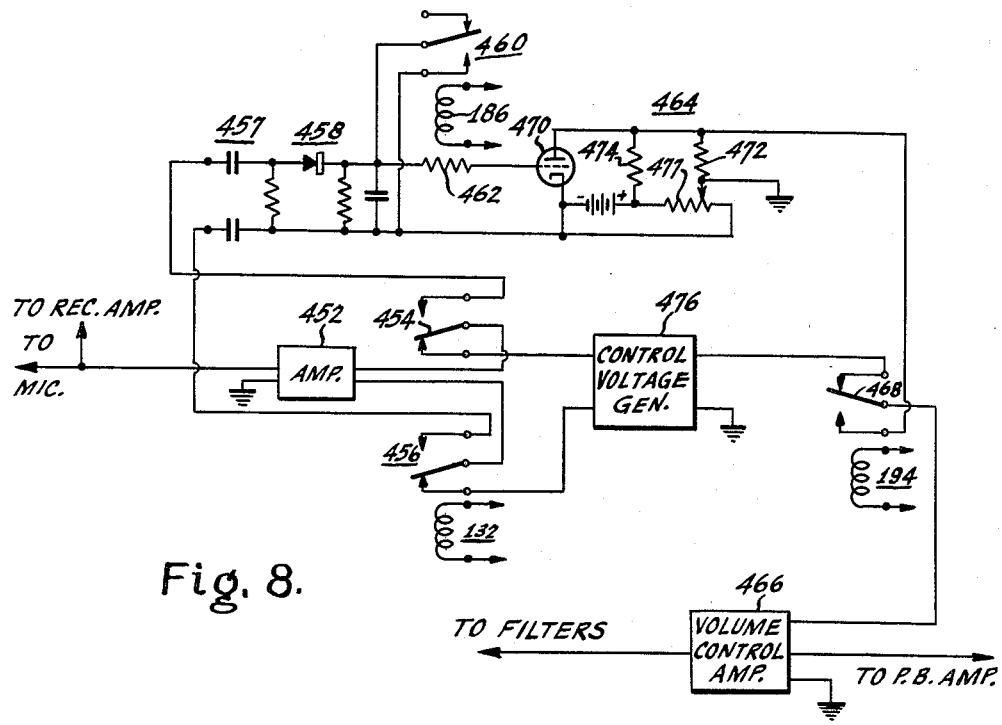

FIG. 7 is a schematic, partially block diagram showing an amplitude control system for adjusting the amplitude of sound to be analyzed which may be used in combination with the system illustrated in FIGS. 1 and 2; and FIG. 8 is a schematic, partially block diagram showing another system for adjusting the amplitude of sound to be analyzed which may be used in combination with the system illustrated in FIGS. 1 and 2.

Referring more particularly to the drawings, the system shown in FIG. 1 is operative to recognize and print speech syllables. Sound is picked up by a microphone 10 and converted into electrical signals. These signals are amplified in a magnetic recording amplifier 12. The amplifier 12 includes a conventional oscillator for providing recording bias signals and erase energy. The signals to be recorded and the bias signals are applied to a magnetic recording head 14. The erase energy is applied to an erase head 16. The magnetic recording and erase heads cooperate with an endless loop, magnetic record 18. This record 18 may be a magnetic tape record which is joined at the opposite ends thereof to form the endless loop. A tape transport suitable for driving the endless loop tape record 18 is schematically shown as including an idler pulley 20 and a drive pulley 22. The drive pulley 22 is driven by a constant speed motor 24.

Figure 6:
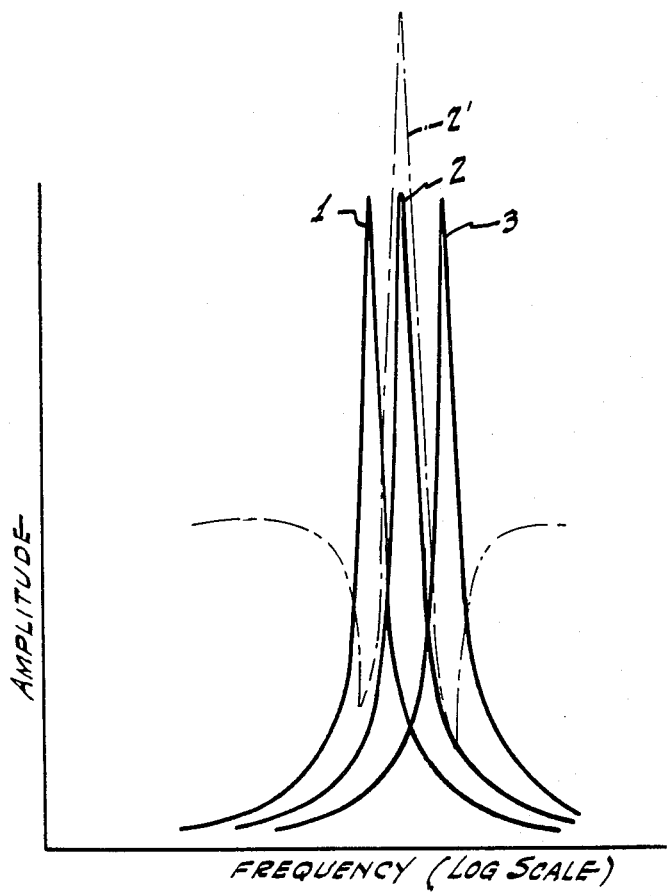
FIG. 6 is a graph showing the frequency response characteristics of the amplitude comparing analyzer shown in FIG. 3.

The signals recorded on the tape record 18 are reproduced by a magnetic playback head 26. The magnetic playback head 26 is spaced from the magnetic recording head 14 by a given distance indicated in the drawing by the legend "D." This distance "D" is selected having regard to the speed of tape travel so that the signals recorded on the tape record 18 are delayed by a predetermined time. A suitable delay time may be slightly longer than the longest syllable encountered in normal speech. The reproduced signal is amplified in a conventional playback amplifier 28 which may include conventional compensating circuits to provide for high fidelity magnetic playback. The output of the playback amplifier is fed to eight frequency selecting channels 30, 32, 34, 36, 38, 40, 42 and 44. The output of the playback amplifier is also fed to a syllable detector channel 46 which has a generally uniform frequency response and which performs a control function to be described hereinafter. Each channel includes a frequency selecting network in the form of a band pass filter. A band pass filter 48 in the first channel 30 may transmit a frequency band from 250 to 500 c.p.s. A band pass filter 50 in the second channel 32 may pass a frequency band from 500 to 775 c.p.s. A band pass filter 52 in the third channel 34 may pass a frequency band from 775 to 1100 c.p.s. A band pass filter 54 in the fourth channel 36 may pass a frequency band from 1100 to 1500 c.p.s. A band pass filter 56 in the fifth channel 38 may pass a frequency band from 1500 to 2000 c.p.s. A band pass filter 58 in the sixth channel 40 may pass a frequency band from 2000 to 3000 c.p.s. A band pass filter 60 in the seventh channel 42 may pass a frequency band from 3000 to 5000 c.p.s. A band pass filter 62 in the eighth channel 44 may pass a frequency band from 5000 to 7000 c.p.s. It will be observed that the frequency bands passed by the different channels are adjacent to each other in frequency. The band pass filters in the respective channels may be conventional inductance-capacitance filters of one or more sections. The typical frequency response of the filters is shown in FIG. 6 by the characteristic curves labeled 1, 2 and 3. The output of each of the filters in the various channels is amplified by a different amplifier 64. While eight channels are shown in the illustrated embodiment of the present invention, it may be desirable to provide a greater or a lesser number of frequency selective channels. For example, sixteen channels may be used when it is desired to increase the amount of frequency information necessary for speech or sound analysis.

The outputs of the amplifiers 64 are fed into an amplitude comparing analyzer 66. The details of construction and mode of operation of the illustrated amplitude comparing analyzer 66 will be explained hereinafter. The analyzer provides signal transmission channels for each of the frequency selective channels. Signals will appear in the respective outputs of each of these channels which have polarities determined by the relationship between the strength of the signal in an individual one of the channels and the signal in order of the channels adjacent thereto. In this illustrative embodiment of the present invention, an output signal of a channel in the amplitude comparing analyzer 66 will be negative in polarity if the strength of the frequency component applied to that channel is approximately greater than the average strength of the frequency components which are applied to adjacent channels. It will be recalled that the signal components applied to adjacent channels are in adjacent frequency bands.

The output of each of the signal transmission channels in the analyzer 66 is applied to a different one of eight similar direct current amplifiers 68. Each of the direct current amplifiers is a polarity sensitive device which provides an output signal, in the illustrated case, when, and only when, a negative signal appears in the respective outputs of the channels in the analyzer 66. When deemed desirable, the amplitude comparing analyzer can be designed in accordance with the invention to produce a positive output signal in each channel, rather than a negative signal. In that case, the respective direct current amplifiers 68 may be made sensitive to signals of positive polarity.

The direct current amplifiers 68 each operate an associated relay 70 in response to a signal of certain polarity (negative in the illustrated case) from the amplitude comparing analyzer 66. Each of the relays 70 includes a plurality of sets of contacts. One set of these contacts is connected to a comparing analyzer display 72. Another set of these contacts is connected to a switching device 74 which may be, as will be explained in detail hereinafter, contacts of a control relay. Thus, while a single lead is shown connecting each of the relays 70, the display 72 and the switching device 74, it will be appreciated that each such lead represents more than just a single connection.

The comparing analyzer display 72 includes eight lamps each corresponding to a different one of the frequency selecting channels. Each of the lamps may be connected in series with a source of operating potential (not shown) through one set of contacts in different ones of the relays 70. Thus, the lamps in the display 72 will be illuminated in various sequences as the spectrum of the sound spoken into the microphone 10 changes.

A pair of time sequence switches 76 and 78 may be alternatively connected through the switching device 74 to the relays 70. The time sequence switches may be rotary sequence switches having a plurality of wiper arms. The switches 76 and 78 are connected to a spectral memory 80. This spectral memory is described in the above-referenced article by Harry F. Olson and Herbert Belar. Briefly described, the spectral memory includes a plurality of relays each having a plurality of sets of contacts. (Forty relays are described in the spectral memory discussed in the Olson and Belar article.) The terminals of the time sequence switches 76 and 78 are connected to the relays in the spectral memory 80. The relays 70 associated with the analyzer 66 have contact sets which connect a source of operating potential through the switching device 74 to one of the time sequence switches 76 or 78. Thus, the source of operating potential will be selectively connected to different ones of the relays in the spectral memory 80, and the relays will pull in in accordance with the amplitude-frequency analysis at repeated time intervals discretely established with the sequence switches 76 or 78. A spectral display 82 is provided having as many lamps as there are relays in the spectral memory. The lamps may be associated with contact sets of different ones of the relays in the memory 80. Thus, a visible display is provided which is useful in analyzing the spectrum of a syllable being sounded and in establishing a code whereby the information stored in the spectral memory may be converted in terms of syllables for operating a printer.

The contacts of the relays in the spectral memory 80 may be interconnected by way of a distribution panel 84. This distribution panel is referred to as a spectral decoder and syllable encoder in the Olson and Belar article referenced above. The contacts of the relays in the special memory may be connected in accordance with a code established by a statistical analysis of speech so that the sounding of different syllables will establish a different circuit path through the contacts of the relays in the spectral memory.

The distribution panel 84 effectively connects the spectral memory to a syllable memory 86. The syllable memory, briefly described, may consist of a plurality of relays. Each relay corresponds to a different syllable. The relays in the syllable memory will be selectively energized in accordance with the circuit connections established by the components stored in the spectral memory.

The information in the syllable memory is transferred to a decoder 88. This decoder 88 is described in the Olson and Belar article referenced above and includes a rotary switch and matrix. Different connections are established through the matrix from the contacts in the relays of the syllable memory through the rotary switch. Each of these connections may correspond to a different letter of the syllable stored in the syllable memory. Thus, a printer 90 may be controlled by the decoder to print the syllables stored in the syllable memory. Accordingly, sequences of syllables will be reproduced as words.

The analysis of sound in terms of amplitude and frequency is accomplished in the frequency selecting channels 30, 32, 34, 36, 38, 40, 42 and 44 and amplitude comparing analyzer 66. Further analysis, in terms of time, is accomplished through the operation of the time sequence switches 76 and 78. The invention provides means for controlling these time sequence switches to compensate for the rate or speed at which a syllable or sound may be uttered.

The signals from the microphone 10 are applied to an amplitude detector 91 consisting of an amplifier 92, a rectifier 94, a direct current amplifier 96, and relay 104. The amplifier 92 is a conventional alternating current amplifier. The rectifier 94 may be either a half-wave or a full wave rectifier which provides a direct current signal for operating the direct current amplifier 96. The amplifier 96 is similar to the D.C. amplifiers 68 which follow the amplitude comparing analyzer 66. These D.C. amplifiers 96 and 68 in common provide an output only when a signal of certain polarity is applied thereto. This output may be in the form of a constant current signal. This constant current signal is suitable for operating a relay. The relay 104 will, therefore, be on, or pulled in, when an output signal is produced by the amplifier 96, and will be released in the absence of an output signal. Since an output singal results on occurrence of a syllable and will be produced so long as the syllable is sounded, the relay 104 operated by the D.C. amplifier 96 will be pulled in for the duration of each syllable and released between soundings of successive syllables.

The relay 104 in the detector 91 is connected by way of a switching system 98 to one of two syllable timers 100 and 102 on alternate, successive syllables. The alternate syllable switching system 98 and the two syllable timers will be described in detail in connection with FIG. 2 of the drawings. Briefly, they include a stepping switch and control relay which alternately connect the syllable timers 100 and 102 to certain contacts in the relay 104. The syllable timers 100 and 102 may each include a stepping switch which steps a wiper contactor along fixed contacts in a plurality of levels of contacts at a constant rate. Thus, the wiper will come to rest at a certain level depending upon the duration of the syllable which is detected as described more fully hereinafter. The contacts on each level of the switch are connected to different timing capacitors. Timing controls 106 and 108 are connected, respectively, to the syllable timers 100 and 102. These timing controls, briefly described, include a plurality of relays which are connected to the stepper relays in the time sequence switches 76 and 78. The rate of operation of these relays is controlled by timing capacitors in the various levels of stepping switch contacts in the syllable timers 100 and 102.

For the first of two successive syllables, the syllable timer 100 is operated for the duration of the syllable and provides connections, including certain of the timing capacitors associated therewith, to the timing control 106. The timing control 106 then controls the operation of the time sequence switch 76 so that connections are made between the spectral memory 80 and the amplitude-frequency analyzing system at certain discrete times during the analysis of the first syllable. On the next successive syllable, the alternate switching system 98 connects the relay 104 in the detector 91 to the syllable timer 102. The syllable timer 102 times the duration of the syllable and provides connections including a certain one of the timing capacitors therein to the timing control 108. The timing control 108 then controls operation of the time sequence switch 78. In order to prevent erroneous cross-connections, the switching device 74 is provided between the analyzer 66 and the two different time sequence switches 76 and 78. This switching device 74 may be provided by a multi-contact relay energized on alternate syllables by the alternate syllable switching system 98, as hereinafter more fully described.

The time sequence switches 76 and 78 are connected to their respective syllable timers 100 and 102. The time sequence switches operate reset devices in the syllable timers to reset these timers after the time during which analysis of a syllable takes place.

The amplitude detector 91 including the amplifier 92, rectifier 94, D.C. amplifier 96 and relay 104, together with the syllable timers 100 and 102 and timing controls 106 and 108, operate as a pre-analyzer to analyze the time characteristics of a spoken syllable prior to the frequency and amplitude analysis thereof. One of the syllable timers 100 and 102 ascertains the duration of a syllable. This syllable is then delayed for a given time in the recording and reproducing process. The time delay is provided by the spacing between the record and play back heads along the endless loop record 18.

When the signal is reproduced, it is detected by the wide band detector 46 which includes a rectifier 112, a D.C. amplifier 114 and relay 116. These elements 112, 114 and 116 are similar, respectively, to the corresponding rectifier, D.C. amplifier and relay 94, 96 and 104. The detector 46 therefore detects the reproduction of a syllable. The relay 116 is connected to the timing control and initiates the operation of the control of time its associated sequence switch. Thus, the time analysis of the sound is performed on the reproduced sound as each syllable is reproduced.

The next succeeding syllable is sounded while the first syllable is being analyzed. The duration of this next succeeding syllable is ascertained and determined by the syllable timer 102. The timing control 108 is operated by the detector 46 including the rectifier 112, the amplifier 114 and the relay 116. When the succeeding syllable is reproduced, the other sequence switch is operated to analyze the amplitude and frequency spectrum of the second syllable with respect to time. Thus, while one syllable is being analyzed, the next succeeding syllable is pre-analyzed due to the alternate operation of the respective syllable timers 100 and 102 and the timing controls 106 and 108 in cooperation with the sequence switches 76 and 78.

This pre-analyzer therefore permits the apparatus to analyze and encode or print syllables spoken at various speaking rates. The system also affords an improvement in that the analysis is not entirely limited by the speed of operation of the time analysis portion of the apparatus since the sound or speech information is stored to provide time for the analysis.

The pre-analyzer, time sequence switches 76 and 78 and their associated switching are shown in FIG. 2 of the drawings. The relay 104 of the amplitude detector 91 includes an operating winding 120 and a pair of contact sets 122 and 124. The operating winding 120 is energized by the output current through the detector 91 when a syllable is sounded. The contacts 122 and 124, as well as the other relay contacts which will be described hereinafter, are shown in their normal position. In the case of the relay 104, the contacts are normally released.

A stepping switch 126 having two levels of four stationary contacts, each having a pair of wiper arms for traversing these levels, is provided as part of the alternate syllable switching system 98. This stepping switch may be a conventional, rotary stepping switch such as used in telephone practice. Stepping switches of this type may have more levels and contacts than shown in the drawings. However, levels and contacts not used are generally omitted in the drawings. An operating winding 128 of the switch 126 is connected to the upper set of contacts 124 of the relay 104. This upper set of contacts is of the make-before-break type. Accordingly, when a syllable is detected and the winding 120 is energized, a pulse of current is transmitted from a power supply 130 through the make-before-break contacts 124 so that the wiper arms of the switch 126 advance one step for each energization of the relay 104. As pointed out in connection with FIG. 1, the relay 104 is energized once for each speech syllable. Thus, the stepping switch 126 advances one contact in each of the levels of contacts for each syllable.

Another relay 98' is provided which is part of the alternate syllable switching system 98. This relay 98' is energized by current flowing from the power supply 130 through the operating winding 132 thereof and the contacts and wiper in the first step of the first level of the stepping switch 126. Assuming that a syllable is detected, the wiper arms will advance to the second step in the levels of contacts thereof, and the relay 98' will be de-energized. De-energization of this relay 98' provides a current path through a first set of contacts 134 of the relay 98' and the lower set of contacts 122 of the relay 104 to the syllable timer 100. The syllable timer 100 includes another stepping switch 136 having two levels 138 and 140 of stationary contacts. Each level includes twenty-five contacts. Wiper arms 142 and 144 are provided for traversing the contacts in each of the levels. An operating winding 146 of the stepping magnet, when energized, causes the wiper arms to step along succeeding contacts in each of the levels. The second through twenty-fifth contacts of one of the levels 138 are interconnected with each other. The second through sixth contacts of the other level 140 are also interconnected with each other. A set of relay contacts 148 is associated with the stepping magnet winding 146. A circuit for energizing the stepping magnet winding is completed through these contacts 148, the lower set of contacts 134 of the relay 98', and the lower set of contacts 122 of the relay 104 when a syllable is detected. Thus, the wiper arms 142 and 144 will be caused to step from one set of contacts in each of the levels to the next set of contacts in each of the levels 138 and 140 at a rate determined by the reset time of the stepper magnet and relay. This reset time is established by a capacitor 150 and resistor 152 which are connected across the winding 146 of the stepping magnet. A rate of twenty-five steps per second is suitable. Thus, the arms 142 and 144 will traverse the contacts in each of the levels in one second. It has been found that a syllable will be uttered by most speakers within one second. Accordingly, the wiper arms come to rest on certain contacts in each of the levels at the end of a syllable. For example, a slow talker may complete a syllable by the time that the wiper arms reach the fifteenth step of contacts. A rapid talker, on the other hand, may complete the same syllable when the arms reach the sixth level.

Capacitors 154 are connected between successive contact steps in the level 140 and a common lead 156. The first capacitor is shown as being connected to the sixth contact step. This capacitor desirably has a lower value of capacitance than the succeeding capacitors. Thus, the capacitor connected to the seventh contact step may have a slightly higher capacitance than the capacitor connected to the sixth contact step. The capacitor connected to the eighth contact step may have a still higher value of capacitance, and so forth. For example, the capacitor connected to the sixth contact step may have a capacitance of 1.25 μf. The capacitor connected to the seventh contact step may have a value of capacitance of 1.3 μf. The values of capacitance connected to the succeeding contact steps will be progressively higher. A relay 157 is provided in the timing control for driving the stepper switch back to the home or first contact step in each of the levels.

The wiper arm 142 and the wiper arm 144 are both connected to the timing control 106, the wiper arm 144 being connected to the timing control 106 through a resistor 158. The timing control 106 includes a pair of relays 160 and 162 in a relay pulsing circuit. The relay 160 has an operating winding 164. A capacitor 166 is connected across this operating winding 164 so that the relay 160 will be slow to release. The relay 160 includes a lower and upper set of contacts 167 and 168, respectively. The relay 162 also includes an operating winding and a lower and upper set of contacts 172 and 174. The operating winding of the relay 160 is normally energized by current flowing from the power supply 130 through the lower set of contacts 172 of the relay 162. Thus, the sets of contacts 167 and 168 of the relay 160 are shown normally pulled-in. A circuit for energizing the relay 162 is established through the lower set of contacts 167 of the relay 160 and a lower set of contacts 176 of the relay 116 in the reproduced syllable detector 46. Only the relay 116 is shown in detail in FIG. 2 of the drawings. An operating winding 178 of this relay 116 is energized when a reproduced syllable is detected. The wiper 144 is connected in series with the resistor 158 to the operating winding 170 of the relay 162. The common lead 156 connecting the capacitors 154 is connected to the opposite end of the operating winding 170. Thus, when the wiper arm 144 comes to rest at the end of a spoken syllable on one of the contacts steps, the one of the capacitors 154 connected to that contact step is connected through the wiper arm 144 in series with the resistor 158. The connected timing capacitor 154 and resistor 158 provide a timing circuit for controlling the rate of pulsing of the timing control 106.

The relay 162 will be energized after the duration of the syllable is determined by the syllable timer 100 through the action of the relay 116. It will be recalled that the relay 116 is energized by a reproduced syllable. The syllable is reproduced after a predetermined time delay established by the endless loop magnetic record 18. In accordance with the above-mentioned example of the rate of operation of the stepper switch 136 in the syllable timer 100, it is desirable that this time delay be slightly more than one second to accommodate the longest syllable which will be measured by the syllable timer. Thus, after a syllable is reproduced, the lower set of contacts 176 in the relay 116 is closed and the relay 162 is energized. Since the energization circuit for the other relay 160 includes the lower set of contacts 172 of the relay 162, the relay 160 will become de-energized upon energization of the relay 162. De-energization of the relay 160 causes the contacts 167 and 168 of the relay 160 to release, thus cutting off energizing current to the relay 162. The relay 162 will remain energized for a period determined by the value of the timing capacitor 154 and the resistor 158 which is connected across the operating winding 170 thereof. The relay 162 will therefore remain energized for a predetermined period. The output of the timing control 106 is obtained from the lower contact of the upper set of contacts 174. This output is connected to the time sequence switch 76.

The time sequence switch 76 can be a conventional telephone type stepping switch 181 having ten levels of six contacts each. Ten wiper arms simultaneously traverse the contacts in each of the levels. In the illustrated embodiment, only nine levels are connected for use. Stepping action is controlled by a stepping magnet winding 180. A capacitor 182 and resistor 184 are connected in series across the winding 180 to provide slow release action.

It is desirable to cause the wiper arms of the stepping switch 181 in the time sequence switch 76 to step to each of the contacts in the various levels at discrete times during the analysis of a syllable. In other words, the stepping switch should desirably step to the successive steps of contacts in each of the levels at repeated intervals of certain duration. In the analysis of speed syllables, it has been found desirable that these intervals be of equal time periods for the duration of a syllable. If the same syllable were to be uttered at different rates, so that the durations of the same syllable would be different, the components constituting the syllable should desirably be sampled at different discrete times at equal intervals for the duration of the syllable. The syllable timer 100 and the timing control 106 effect the stepping of the stepping switch 181 in the timing sequence switch 76 through each of the six contact steps thereof at different discrete times depending upon the rate at which the syllable being analyzed is being uttered.

The timing control thus transmits current pulse through the stepping magnet winding 180 of the stepping switch 181 at discrete times determined by the value of the particular capacitor 154 which is connected in the timing circuit across the operating winding 170 of the relay 162. Since the value of the capacitor 154 introduced into the timing circuit depends upon the duration of the syllable, current pulses will be provided in the output of the timing control and transmitted through the winding 180 at a rate determined by the duration of the syllable. It will be noted that a current pulse will be transmitted to the winding 180, through the upper contacts 174 of the relay 162 and the upper contacts 168 of the relay 160, every time that the relay 162 is energized and the relay 160 is deenergized. The relays 160 and 162 therefore provide a controlled, bistable circuit, the control being provided by the reproduced syllable detector.

When the stepping switch 181 reaches the sixth contact step, a circuit is completed across the operating winding 186 of the homing relay 157 in the stepping switch 136. This circuit is completed through the wiper arm 188 in the first level of the stepping switch 181 and the sixth contact of the sixth step in this level. When the homing relay 157 is energized, a set of holding contacts 190 thereof are pulled in. The relay 157 also has an upper set of contacts 192 which are connected through a set of contacts in the relay 98' and the lower set of contacts 122 in the relay 104 to the stepping magnet winding 146. The stepping magnet causes the wiper arms to traverse the contacts thereof and return to the first or home position. When the wiper arms 142 and 144 reach the home position, circuits for energizing the relay 157 are opened and the wiper arms 142 and 144 remain in the home position.

The contact steps of the stepping switch 181 in the time sequence switch 76 are connected to the spectral memory 80. The wiper arms of the stepping switch 181 are connected to a relay 194 of the switching device which alternately connects the frequency spectrum analyzer to the time sequence switch 76 and the time sequence switch 78 on successive syllables. The relay 194 constituting the switching device 74 is controlled by the stepping switch 126 in the alternate syllable switching system 98. The stepper switch in the system 98 also controls switching between the syllable timer 100 and the syllable timer 102. The syllable timer 102 is connected to the other timing control 108. The construction and operation of the syllable timer 102 is identical to the construction and operation of the syllable timer 100 as explained above. Similarly, the construction and operation of the timing control 108 is identical to the construction and operation of the timing control 106 which was previously described in detail. The operation of the timing control 108 is initiated by an upper set of contacts 179 of the relay 116 in the reproduced syllable detector 46 similarly to the lower set of contacts 178 in the case of the timing control 106.

The stepping switch 126 provides switching on alternate syllables between the syllable timers and the contacts 122 and 124 of the relay 104 in the amplitude detector 91. The first level of contacts in the stepping switch 126 is connected to the operating winding 132 in the relay 98'. Thus, as the wiper arms of the stepping switch 126 step between successive contacts, the relay 98' is alternately energized and de-energized. It follows that the stepping switch in the syllable timer 102 will be first connected to the relay 104. The syllable timer 100 will then be connected to the relay 104 on occurrence of the next successive syllable. Alternate ones of the contacts in the second layer of contact steps of the stepping switch 126 are connected to the operating winding in the relay 194. The relay 194 is therefore de-energized on the first syllable and energized on occurrence of the next successive syllable. The eight different relays 70 in the frequency and amplitude comparator are connected to the wiper arms associated with eight different levels of contacts in the stepping switches of the time sequence switches 76 and 78.

The pre-analyzer described by way of example in connection with FIG. 2 therefore provides for the same analysis with respect to time for similar syllables regardless of the rate at which these syllables are sounded. Thus, a phonetic typewriter as described in connection with FIG. 1 of the drawings which includes a pre-analyzer provided by the present invention can accommodate a large group of different speakers who might speak at different rates.

Figure 3:
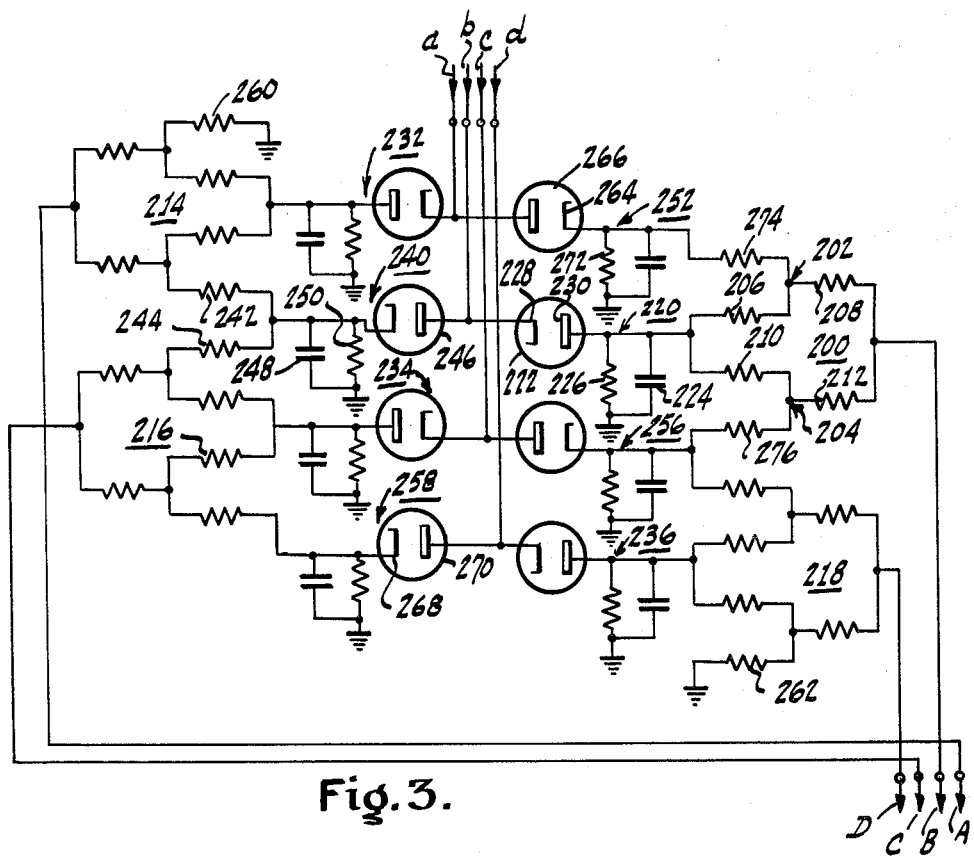
FIG. 3 is a schematic circuit diagram illustrating the principles of an amplitude comparing analyzer provided in accordance with the present invention.

Referring to FIG. 3, a circuit is shown embodying the principles of the amplitude comparing analyzer 66 which was described in connection with FIG. 1 of the drawings. The amplitude comparing analyzer 66 includes eight channels for comparing the amplitudes of the eight frequency component signals provided by each of the frequency selective channels 30, 32, 34, 36, 38, 40, 42, and 44. A four channel amplitude analyzer is illustrated in FIG. 3 in order to simplify the discussion while making it possible to point out all the novel features and mode of operation of the amplitude comparing analyzer 66.

The amplitude comparing analyzer 66 is shown as having four input terminals $a$, $b$, $c$ and $d$. The analyzer also has four output terminals A, B, C and D, each corresponding to a different one of the input terminals. Circuit means are connected between the input terminals and the output terminals which provide four different signal transmission channels.

The channels are essentially identical, and each includes an amplitude comparing network and a rectifier circuit. For example, the signal channel between the input terminal $b$ and the output terminal B includes an amplitude comparing network 200. This network has a pair of resistance branches 202 and 204. The branch 202 includes a first resistor 206 and a second resistor 208. The second branch 204 includes a resistor 210 which is desirably of the same value as the resistor 206 and a resistor 212 which is desirably of the same value as the resistor 208. By way of example, the resistors 206 and 210 may be of 220K (kilohms). The resistors 208 and 212 may be one M (megohm).

The signal transmission channel connected between the input and output terminals $a$–A, $c$–C and $d$–D have similar amplitude comparing networks 214, 216 and 218, respectively. The signal transmission channel between the input and output terminals $b$–B includes a rectifier circuit 220 comprising a diode 222, a filter capacitor 224 and a resistor 226. While a vacuum tube diode is shown in the drawings, a dry rectifier, crystal or semiconductor diode may be used alternatively. It is desirable that all diodes have the same characteristics. The cathode 228 of the diode 222 is connected to the input terminal $b$. The anode 230 of the diode is connected to the comparing network 200. The diode 222 is therefore polarized to transmit current in one direction, namely from the output terminal B to the input terminal $b$. In other words, the diode 228 is polarized to transmit negative current.

Similar rectifier circuits 232, 234 and 236 are connected between the comparing networks and the input terminals in the other signal transmission channels. The diodes included in each of these rectifier circuits 232, 234 and 236 are polarized similarly to the diode 222 in the rectifier circuit 220 to transmit negative current.

The analyzer also includes signal applying circuits connected from each of the input terminals $a$, $b$, $c$, $d$ to the amplitude comparing networks 214, 200, 216, and 218 of adjacent channels. These signal applying circuits include different rectifier circuits. In the case of the second input terminal $b$, a signal applying circuit including a rectifier circuit 240 and a pair of resistors 242 and 244 connects the input terminal $b$ to the comparing network 214 associated with the first channel connected to the input terminal $a$ and the amplitude comparing network 216 in the third channel connected to the input terminal $c$. The values of these resistors 242 and 244 may be equal to each other and also equal to the value of the resistors in the comparing circuits which are connected to the rectifiers therein. Thus, the values of the resistors 242 and 244 may be equal to the value of the resistors 206 and 210 which, in the case of the example noted above, is 220K.

The rectifier circuit 240 includes a diode 246, a filter capacitor 248, and a resistor 250. The filter capacitor 248 and the resistor 250 may have the same values as the filter capacitors and resistors in the rectifier circuits of the signal transmission channels. The diode 246 is also preferably of the same type as the diodes in the signal transmission channels and has the same characteristics. It will be noted, however, that the diode 246 is polarized oppositely to the diodes in the rectifier circuits 220, 232, 234 and 236 of the signal transmission channels. In other words, the diode 246 transmits positive current.

Signal applying circuits 252, 256 and 258, similarly to the signal applying circuit 240, are connected respectively to the input terminals $a$, $c$ and $d$. In the case of the signal applying circuits 252 and 258, connections are made to only one comparing network, since these input terminals are in the first and last signal transmission channels, respectively. Resistors 260 and 262 are also connected to the junction between the resistors in one of the branches in the comparing networks 214, 218, respectively, and to a point of reference potential, such as ground. It may be desirable to connect the resistor 272 to the cathode 264 of the diode 266 in the signal applying circuit 252.

It may also be desirable to connect the resistor 260 to the cathode 268 of the diode 270 in the signal applying circuit 258. Thus, the signal applying circuit associated with the last input terminal $d$ will be connected to the comparing network in the signal transmission channel connected to the first input terminal $a$. In this case, the signals transmitted in the last channel will be compared with the signals transmitted through the first channel. In that event, the lamps in the amplitude comparing analyzer display 72 shown in FIG. 1 will desirably be arranged in a circle rather than linearly as illustrated in FIG. 1.

Signals are applied to the amplitude comparing analyzer each corresponding to different frequency components of the sound to be analyzed. Thus, the signals applied to the input terminals $a$, $b$, $c$ and $d$ may be in successive, adjacent frequency bands. These signals need not be compressed or normalized in amplitude so that the information corresponding to the amplitude of the sound is preserved. The band of components applied to the input terminal $a$ may have a frequency characteristic such as illustrated by the curve 1 in FIG. 6 of the drawings. The band of signal components applied to the input terminal $b$ may have a frequency characteristic illustrated by the curve 2 in FIG. 6 of the drawings. Similarly, the band of signal components applied to the input terminal c may have a frequency characteristic illustrated by the curve 3 in FIG. 6 of the drawings.

Taking the signals applied to input terminal b by way of example, these signals are rectified in the rectified circuit 220. A voltage corresponding to the peak amplitude of the signals at any instant will appear across the filter resistor 226. These voltages will be negative with respect to the point of reference potential indicated as ground. A first voltage approximately equal to the voltage across the resistor 226 will appear across the resistor 206 and resistor 210. These voltages will be negative in polarity as measured at the junction between the resistors 206 and 208 and the resistors 210 and 212 (with respect to ground). Signal components in the adjacent band of frequencies immediately below the frequencies of the signals applied to the input terminal b are rectified in the rectifying circuit 252. Thus, a direct current voltage which is positive with respect to ground appears across the resistor 272 in the filter circuit of the rectifier 252.

A voltage approximately equal to the voltage across the resistor 272 in the signal applying circuit 252 is applied across a resistor 274 connected to the junction between the resistor 206 and 208. Signals from the frequency band immediately above the frequency band applied to the input terminal b are rectified in the rectifier 256. This rectifier 256 is similar to the rectifier 252 and applies a positive voltage equal to the peak amplitude of the signal voltages applied to the input terminal c to the junction between the resistor 210 and resistor 212 in the second branch 204 of the amplitude comparing network 200. A voltage equal to the additive combination of the sum of the voltages across the resistors 206 and 274 in the transmission channel 220 and the signal applying means 252 appears across the resistor 208 in the first branch of the amplitude comparing network. Similarly, a voltage equal to the sum of the voltages across the resistor 210 and a resistor 276 in the signal applying circuit 256 appears across the resistor 212 in a second branch 204 in the amplitude comparing network 200. The sum of the voltages across the resistors 208 and 212 appears at the output terminal B of the signal transmission channel. It follows that the signals transmitted through each signal transmission channel are compared with the signals transmitted through adjacent transmission channels by additively combining signals in terms of their components of opposite polarity, and then combining the sum of these opposite polarity components.

Expressed mathematically, and assuming a negligible voltage drop in the resistors in the amplitude comparing and signal applying networks, it follows that $$V_B = (V_a + V_c - 2V_b)k$$

where $V_B$ is the output voltage at the output terminal B;
$V_b$ is the peak voltage applied to the input terminal b;
$V_a$ is the peak voltage applied to the input terminal a;
$V_c$ is the peak voltage applied to the input terminal c; and
$k$ is a constant.

It follows from the foregoing equation that the voltage at the output terminal B will be negative if the voltage applied to the input terminal b is larger than the average of the signal voltage applied to the input terminals a and c. Thus, by providing polarity sensitive means associated with the output terminal A, B, C, D, the amplitude relationships among the signal voltages applied to the input terminals can be determined.

The amplitude comparing analyzer effectively increases the sensitivity and sharpens the frequency characteristics of the signals transmitted by each of the frequency selective networks associated with the amplitude comparing analyzer. This feature is illustrated graphically in FIG. 6 of the drawings. The curve 2', indicated by the dashed lines, corresponds to the effective transmission characteristic of each frequency selective network including its associated signal transmission channel in the amplitude comparing analyzer. It will be noted that the characteristic curve 2' is obtained by subtracting the amplitude values of the curve 1 and the curve 3 from twice the amplitude value of the curve 2. The response characteristic shown by the curve 2' is 160% higher in amplitude than that shown by the curve 2, and the skirts of the curve 2' are much sharper than the skirts of the curve 2. In other words, the skirts of the curve 2' have a greater slope than the skirts of the curve 2.

Figure 5:
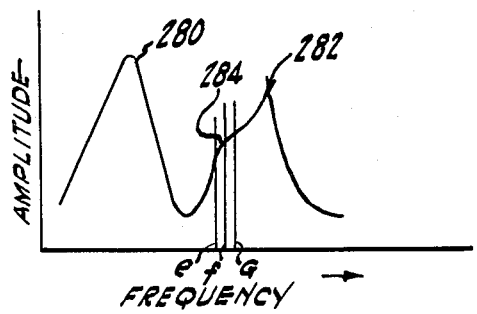
FIG. 5 is a curve of amplitude characteristic with respect to frequency at a given instant of a signal corresponding to a spoken sound.

Another feature of the amplitude comparing analyzer is that it provides means for the detection of peaks in the spectrum or the formant frequencies of sounds being analyzed. It is well recognized that a speech syllable can be identified by three formant frequencies. Such a formant is illustrated in FIG. 5 of the drawings. It will be noticed that formants are shown at a relatively large peak 280 at a low frequency, a peak 282 at a high frequency and a relatively small, minor peak 284 or an area around a point of inflection at an intermediate frequency. It is ordinarily difficult to detect a relatively low amplitude peak such as the intermediate frequency peak 284 because of the small difference between the amplitudes of signal components corresponding to the peak of the signal components immediately above and below this peak. These frequency components are indicated by e, f, g in the drawings. The amplitude comparing analyzer operates effectively to detect any change in the slope of the sound spectrum and therefore detects any peak of the type indicated at 284. It will be apparent that, although the amplitude of the frequency components in the higher frequency band g may be slightly greater than the amplitude of the frequency components in the intermediate band f, the signal voltage in the intermediate frequency band f is likely to be greater than the average of the signal voltages from the lower frequency band e and higher frequency band g. The output voltage from the amplitude comparing analyzer will be of proper polarity to indicate a peak in the formant (polarity will be negative in the case of the analyzer illustrated in FIG. 3). Thus, the amplitude comparing analyzer provided by the invention preserves the amplitude information in the speech sounds and provides for a more accurate analysis of speech syllables in a phonetic typewriter or in other speech analysis apparatus.

Figure 4:
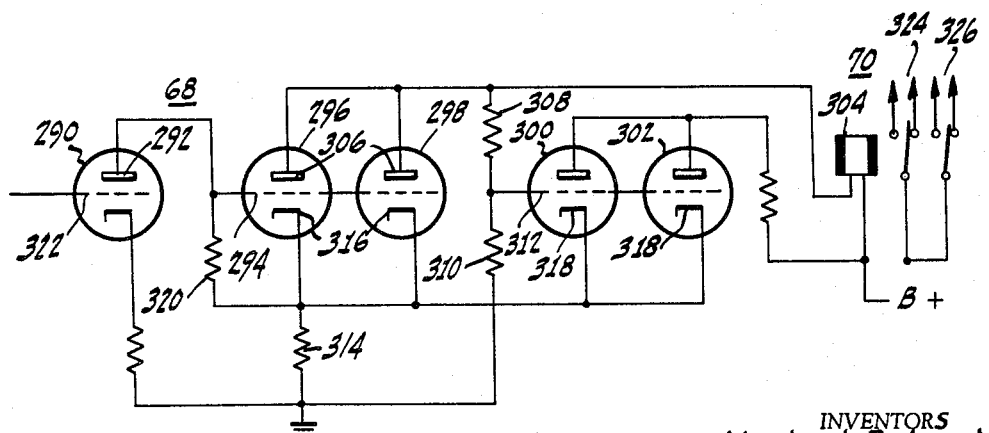
FIG. 4 is a more detailed schematic circuit diagram of one channel of direct current amplification, and a relay stage which forms part of the system shown in FIG. 1.

Referring to FIG. 4 of the drawings, there is shown one of the direct current amplifiers 68 and one of the relays 70 typical to any of the D.C. amplifiers and relays in the amplitude-frequency analyzer. The direct current amplifier includes a first tube 290 which is connected to the output terminal of a signal transmission channel in the amplitude comparing analyzer. The anode 292 of this tube is connected to the grid 294 of a relay control tube 296. Another tube 298 is connected in parallel with the tube 296 in order to provide increased current transmission capacity. A single electrical discharge tube having a higher current rating may be used. Another pair of tubes 300 and 302 are connected in parallel and function as load control tubes. A source of operating voltage B+ is connected through an operating winding 304 of the relay 70 to the anodes 306 of the relay control tubes 296 and 298. This source of voltage is also connected across a voltage divider provided by two resistors 308 and 310 which are connected between the relay operating winding and ground.

The grids 312 of the tubes 300 and 302 are connected to the junction of the resistors 308 and 310. The voltage applied to these grids 312 is sufficiently positive to normally cause the tubes 300 and 302 to conduct and draw current. However, the values of the resistors 308 and 310 are sufficiently high to prevent passage of current of amplitude sufficient to operate the relay 70. When the tubes 300 and 302 conduct, a voltage which is positive with respect to ground appears across a cathode resistor 314. This cathode resistor 314 is in a cathode circuit common to the cathodes 316 of the tubes 296 and 298 and the cathodes 318 of the tubes 300 and 302. A resistor 320 of the tube 290 is connected between the cathodes and the grid 294 of the relay control tubes 296 and 298. The values of the resistors 314 and 320 are apportioned so that, when the tubes 300 and 302 are conducting, the tubes 296 and 298 are cut off.

The voltage across the cathode resistor 314 also is applied to the anode 292 of the first tube 290 and provides operating potential therefor. The resistor 320 functions as the plate resistor of the tube 290. A very low voltage appears at the grid 294 of the tube 296 as long as the tube 290 is conducting. Since the cathodes 316 of the tubes 296 and 298 are well above ground potential, this makes the grids 294 negative with respect to its cathode so as to inhibit conduction in the tubes 296 and 298. However, when a negative voltage, such as would indicate a peak in the formant of a speech syllable being analyzed, is applied to the grid 322 of the first tube 290, a positive voltage appears at the grid 294 of the relay control tubes. These relay control tubes are then triggered into conduction.

When the tubes 296 and 298 conduct, sufficient current is drawn through the operating winding 304 of the relay 70 to cause the relay 70 to pull in. The voltage drop across the resistance of the relay winding 304 causes a drop at the junction of resistors 308 and 310, making this junction point less positive, and thus cutting off the tubes 300 and 302. While the current drain on the source of operating potential is increased when the relay control tubes 296 and 298 conduct, the drain is decreased due to cut-off of the tubes 300 and 302. Therefore, the load on the source of operating potential is approximately constant although the states of conduction of the tubes 296 and 298 and the tubes 300 and 302 become reversed. As soon as the signal of negative polarity is removed from the grid 322 of the first tube 290, the state of conduction of the respective tubes reverses and the tubes 296 and 298 again resume their normally cut-off condition. Thus, the operating current through the winding 304 of the relay 70 is cut off and the relay releases.

The relay 70 includes a pair of sets of contacts 324 and 326, the front contacts of which are connected, respectively, to the tongues or swingers of the contacts in the relay 194 of the switching device 74 and the lamps in the comparing analyzer display 72. Thus, as the formants of the sounded speech change, current will be supplied to light different ones of the lamps through the contacts 326 of different ones of the relays 70. Current will also be supplied through the contacts 324 of the relays 70 to different ones of the wiper arms in the stepping switches in the time sequence switches 76 and 78.

Referring to FIG. 7 of the drawings, apparatus is shown which provides, in combination with the timing control illustrated in FIG. 2 of the drawings, amplitude responsive means for pre-analyzing the sounds of speech prior to analysis of the frequency and amplitude components thereof.

The speech signals from the microphone 10 (FIG. 1) are amplified in an amplifier 400 and applied to an amplitude detector 406 through an alternating current coupling circuit 401. The amplifier 400 may have a single-ended output appearing between an output terminal thereof and a point of reference potential, such as ground. The alternating current coupling circuit utilizes a pair of capacitors 402 and 404 which block the direct current components of the amplified speech signals and couple only the alternating components thereof to the amplitude detector 406.

The amplitude detector 406 is essentially a peak detector for deriving and storing a voltage equal to the peak amplitude of the sound signals applied thereto. This detector includes a diode 408, an input resistor 410, an output resistor 412 and a storage capacitor 414 connected across the output resistor 412. The time constant of the charging circuit for the capacitor is made small as compared to the discharge circuit so that a voltage corresponding to the peak amplitude of the sound will be stored across the storage capacitor 414 for a period at least as long as the duration of the syllable. Thus, the time constant of the discharge circuit defined by the resistor 412 and the capacitor 414 is preferably greater than one second. The time constant of the charging circuit including both resistors 410 and 412 as well as the capacitor 414 is desirably no greater than a few milliseconds.

The peak detector is connected to one of two amplitude control devices 416 and 418 through a switching arrangement provided by two sets of contacts 420 and 422 of the relay 134 in the alternate switching system 98'. The winding 132 of this relay 134 is shown in FIG. 7 of the drawing. This winding is connected to its energizing circuit as shown in FIG. 2, as indicated by the arrows leading from the winding.

The amplitude control devices 416 and 418 are substantially identical. The amplitude control device 416 includes a stepping switch 424 which may be a conventional telephone type stepping switch having a plurality of contacts in a plurality of levels of contacts. Wiper arms 429, 431 and 433 are provided for the contacts in each level which simultaneously traverse the contacts when driven by a stepping magnet 426.

A plurality of resistors 428 are connected between contacts in different levels of the stepping switch 424 which are traversed by the wiper arm 429 to define a first potentiometer 435. Other resistors 430 are similarly connected between contacts in different levels of the stepper switch which are traversed by another wiper arm 431 to define a volume control potentiometer 437. All contacts except for the first or home contact in different levels of the stepper switch 424 which are traversed by another wiper arm 433 are connected together to a set of relay contacts 432 which serve for returning or homing the stepping switch as will be explained in detail hereinafter.

A source of direct current of predetermined voltage, illustratively designated herein as a battery 434, is connected across the potentiometer 435. The battery is polarized so that a negative potential is applied to the lower end of the potentiometer.

The voltage appearing at the arm of the potentiometer 435 and the voltage detected by the peak detector 406 and appearing across the capacitor 414 are compared in a voltage comparison circuit. This comparison circuit operates the stepping magnet 426. The comparison circuit includes an electron tube 436 which operates a relay 438 by energizing its relay winding 440. The contacts of the relay 438 are connected to the stepping magnet 426 through the interrupting contacts 442 thereof. The wiper arm 429 is connected through the relay contacts 422 of the alternate syllable switching arrangement to the storage capacitor 414. The storage capacitor 414 is connected through the other contacts 420 of the alternate syllable switching arrangement to the grid of the tube 436. Due to the polarization of the diode 408 in the peak detector, a positive voltage appears at the top of the capacitor 414. A negative voltage appears at the wiper arm of the potentiometer. The tube 436 is designed to conduct only when a positive voltage is applied to the grid thereof. Thus, current passes through the tube 436, the winding 440 of the relay 438, and the stepping magnet 426. The magnet will be operated, so long as the voltage across the capacitor 414 exceeds the voltage at the wiper arm of the potentiometer 435.

The wiper arms traverse the contacts until a state of equilibrium of voltages exist. Thus, the wiper arm 431 on the volume control potentiometer 437 defined by the resistors 430 is brought to a point determined by the amplitude of the sound to be analyzed and a certain predetermined voltage set by the battery.

The volume control potentiometer 437 is effective in adjusting the amplitude of each syllable of the spoken sounds to be a certain amplitude. Signals from the microphone are applied to the recording amplifier 12 (FIG. 1) and to the amplifier 400 simultaneously. Signals corresponding to each speech syllable are recorded and played back after a time interval at least as long as the duration of any expected syllable. The delay of each syllable due to the recording and playback process is used to detect the amplitude of the syllable and set the volume control potentiometer 437.

The volume control potentiometer is connected across the output of the playback amplifier 28 (FIG. 1) in the case illustrated herein. The volume control potentiometer 437 is effectively connected across the input to the analyzing system. One end of the volume control is connected to a point of reference potential, such as ground. The other end of the volume control is connected to the playback amplifier through a set of relay contacts 444 of the relays 194 forming part of the alternate syllable switching arrangement 74 (FIG. 2). The winding of the relay 194 is shown in FIG. 7 together with arrows indicating connections to the energizing circuit therefor shown in FIG. 2 of the drawings. The wiper arm 431 of the volume control is connected through another set of contacts 446 of the relay 194 to the filters 48, 50, 52, 54, 56, 58, 60, 62 of the analyzing system.

The playback amplifier is designed to amplify the signals to a level such that at least some attenuation is required. The volume control then imparts sufficient attentuation in the case of each syllable such that all syllables have a certain amplitude. This certain amplitude may be varied by varying the voltage from the battery 434.

In order to provide desired amplitude control characteristics consistent with the characteristics of the analyzing system, the volume control potentiometer defined by the resistors 430 may have different characteristics by providing resistors 430 with different values of resistance. Thus, the volume control may be provided with logarithmically varying resistance characteristics or any other variation in the resistance characteristic thereof.

The operation of the amplitude adjusting system to adjust the amplitude of successive spoken syllables will be apparent from FIG. 7 of the drawing when viewed with FIG. 2 of the drawings. Assuming a first syllable is uttered, the alternate syllable switching system is operated so that the relay 132 releases. Connections are then made through the contacts 420 and 422 of the relay to the potentiometer 435 defined by the resistors 428 in the stepping switch 424 and to the grid of the tube 436. As the syllable is being sounded, the stepping magnet 426 is energized and the wiper arms of the stepping switch 425 are moved to an equilibrium position corresponding to the peak amplitude of the sound uttered during the syllable. Upon occurrence of the next succeeding syllable, the relay 132 pulls in and the amplitude detector is connected to the amplitude control 418. The amplitude control 418 is then operated to provide a volume control setting corresponding to the peak amplitude of the next succeeding syllable.

The relay 194 is operated simultaneously with the relay 132 upon occurrence of the next succeeding syllable and connects the volume control potentiometer 437 defined by the resistors 430 across the playback amplifier. The wiper arm is connected to the filters of the analyzing system.

As pointed out in connection with FIG. 2 of the drawings, the time sequence switch 76 is operated upon occurrence of the next succeeding syllable to step at discrete times based on the duration of the first sounded syllable. Thus, the amplitude of the sound is adjusted after playback and while the succeeding syllable is being sounded. The delay of the signals in the recording and reproduction process is utilized to pre-analyze the amplitude of the speech syllables and compensate for variations in amplitude without, however, distorting the sound and disarranging the formant frequencies thereof.

When the time sequence switch reaches the bottom or sixth level thereof, an energizing circuit for the winding 186 of the homing relay is completed. Current is therefore applied directly from a power supply 448 to the stepping magnet 426. Power is cut off when the wiper arms return to their home position, since the connection from the power supply through the contacts 432 to the stepping magnet 426 is broken when the wiper arm 433 reaches the home contact.

Another set of contacts 450 is pulled in upon energization of the homing relay winding 186. These contacts are connected across the capacitor 414 in the peak detector and serve the discharge this capacitor after the syllable has been analyzed.

The other amplitude control 418 operates similarly to the amplitude control 416 in conjunction with the alternate syllable switching relays 132 and 194 as is the case with the amplitude control 416 described in detail above.

Referring to FIG. 8 of the drawing, another embodiment of an amplitude control system for the pre-analyzer of the speech analysis apparatus is shown. This amplitude control system includes an amplifier 452 similar to the amplifier 400 connected to the microphone to amplify the sounds of speech as they are recorded on the endless tape record. The amplifier 452 is connected through sets of contacts 454 and 456 which may be part of the relay 134 in the alternate switching system 98' which is energized by the relay winding 132. The amplifier 452 applies signals through an alternating current coupling network 457 including a pair of capacitors to a peak detector 458. The coupling network and the peak detector are similar to the coupling network 401 and peak detector 406 shown in FIG. 7. The peak detector 458 includes a storage capacitor, a set of relay contacts 460 is connected across the storage capacitor to discharge the capacitor after a syllable is analyzed.

The peak detector 458 is coupled to a high resistance resistor 462 (e.g. one megohm) to a direct current amplifier 464 having a logarithmic gain characteristic. The peak detector 458 and the amplifier 464 constitute a control voltage generating system which generates a control voltage related to the amplitude of syllables of the sounds to be analyzed.

A volume control amplifier 466 is provided which has a variable gain characteristic. This amplifier 466 may be of the type shown in U.S. Patent No. 2,782,266, issued February 19, 1957, to Herbert Belar, one of the inventors named herein. The control voltage may be applied to the terminal 44 on the patented amplifier. The terminal 44 may be directly connected to the arm of the potentiometer 125. Thus, the tapped switching device and its associated circuitry, not necessary to the present use of the amplifier, is desirably eliminated. The gain of the volume control amplifier 466 is inversely proportional to the logarithm of the control voltage applied thereto. The logarithmic amplifier 464 is provided with a gain characteristic directly proportional to the logarithm of the voltage from the peak detector 458. Accordingly, the gain of the volume control amplifier will be inversely proportional to the voltage output of the peak detector 458. It may be desirable, however, in some cases, to provide a logarithmic gain characteristic in the volume control amplifier 466. The transfer characteristic of the amplifier 464 can then be adjusted to provide a linear response so as to utilize the logarithmic characteristic of the volume control amplifier 466.

A pair of control voltage generators are provided in combination with the alternate syllable switching. In addition to the relay contacts 454 and 456, a set of relay contacts 468 may be provided which is energized by the winding of the relay 194 in the alternate syllable switching arrangement 74.

Upon sounding of a first syllable, the alternate syllable switching 132 is energized so that the amplifier 452 is connected to the peak detector 458. The peak detector 458 develops a voltage corresponding to the peak amplitude of the first syllable which is stored for a time longer than the duration of the syllable. This voltage is applied to the grid of a tube 470 in the logarithmic amplifier 464. Because of the high resistance of the resistor 462, the tube 470 operates on the logarithmically curved portion of its transfer characteristic and provides an output voltage corresponding to the logarithm of the voltage appearing across the capacitor in the peak detector 458. This output voltage appears across a resistor 472 which is connected to a potentiometer 477. The potentiometer 477 and the resistor 472 are in turn connected across a plate resistor 474 of the tube 470. The resistor 472 and potentiometer 477 provide a balancing circuit for balancing out the direct current component of the plate current of the tube in the absence of a signal. Upon occurrence of the next succeeding syllable, the alternate syllable switching relay 194 is operated to pull in and the signal output of the logarithmic amplifier is applied to control the gain of the volume control amplifier. Thus, during occurrence of the second or next succeeding syllable, the volume or amplitude of the first syllable is adjusted. The gain of the volume control amplifier 466 is varied correspondingly to the amplitude of the syllable being analyzed. The other control voltage generator 476 operates similar to the control voltage generator provided by the peak detector 458 and log amplifier on alternate syllables.

From the foregoing description, it will be apparent that there has been provided improved apparatus for analysis of sound, such as the sound of speech, by means of which there results greater accuracy of analysis and facility for accommodating different speaking rates. While there has been shown, in diagrammatic form, a phonetic typewriter incorporating apparatus in accordance with the invention, various components useful therein, as well as variations in the disclosed apparatus, all coming within the spirit of the invention, will, no doubt, readily suggest themselves to those skilled in the art. Hence, it is desired that the foregoing to be considered as illustrative and not in any limiting sense.

What is claimed is:

1. Apparatus for analyzing a sound which comprises means for separating said sound into a plurality of components of different frequencies, means for measuring the duration of successive syllables during the passage of said sound, and means responsive to said measurement for dividing the duration of said successive syllables into discrete variable time intervals, said responsive means including means for momentarily interrupting each of said syllables at the beginnings and ends of said discrete intervals.

2. Apparatus for analyzing sound which comprises means responsive to said sound for separating said sound into a plurality of sound components each in a different band of frequencies of the acoustic spectrum, means responsive to the relative strengths of said components in the ones of said bands which are adjacent to each other in frequency for selecting certain of said components in said adjacent bands which correspond to amplitude peaks in said spectrum, and means operative at discrete times during the period of a passage of said sound and responsive to said sound as a function of the duration of said passage for detecting the presence of said components selected by said selecting means.

3. Apparatus for analyzing a signal representing sound passages which comprises a plurality of frequency selection networks for separating said signal into components in a plurality of frequency bands, said bands being adjacent to each other in frequency, means for comparing the amplitude of each said component with the amplitudes of the components in the bands adjacent thereto for selecting certain of said components, means for sampling said certain components at discrete times, and means responsive to the duration of signals representing each of said passages for selecting said times at given intervals during the analysis of said passage.

4. Apparatus for analyzing sounds in terms of the amplitude-frequency-time characteristics thereof which comprises means for separating said sounds into a plurality of frequency components in different frequency bands, means responsive to the relative amplitudes of successive groups of said components for determining the component in each of said groups of greater amplitude than the average amplitude of the other components therein, said groups including at least one component of another group, means for sampling said greater amplitude components at a plurality of discrete times, means responsive to the duration of each passage of said sounds for establishing different programs of certain discrete times and for controlling said sampling means to sample at said certain discrete times in accordance with said programs, and means for delaying the application of said sounds to said separating means for at least the duration of each said passage while said program therefor is being established.

5. Apparatus for analyzing speech sounds which comprises means responsive to said sounds for determining the duration of individual spoken syllables therein, means operative simultaneously with said duration determining means for recording said sounds, means for reproducing said recorded sounds after a given time at least as long as the duration of an individual one of said syllables, means for separating said reproduced sounds into a plurality of components each within a different frequency band, means responsive to the amplitude of those of said components which are within adjacent frequency bands for selecting the ones of said components which are higher in amplitude than the average amplitude of the components in said adjacent frequency bands, means for testing said frequency bands to detect said ones of said components, and means operated by said duration determining means for operating said testing means at discrete times spaced at given intervals for the duration of a syllable.

6. The invention as set forth in claim 5 including means operated by said reproduced sound for controlling said timing means to initiate operation of said sampling means.

7. Acoustic apparatus for analyzing speech sounds in terms of amplitude-frequency-time characteristics thereof which comprises means for converting said speech sounds into voice frequency electrical signals, magnetic recording and reproducing means for recording said signals and for reproducing said signals after a given interval following recording thereof, means responsive to said signals for detecting the beginning and end of signals corresponding to speech syllables, timing means operated by said detecting means for determining the duration of said syllables, a sequence switch having a plurality of levels of successively arranged stationary contacts, wiper arms for each level, means controlled by said timing means for causing each of said wiper arms successively to traverse the stationary contacts of its level at selected intervals for the duration of each of said speech syllables, a plurality of signal channels, each channel including a different frequency selective network capable of transmitting a component of said signals within a predetermined frequency band, said bands in successive ones of said channels being adjacent to each other in frequency, means for comparing the amplitudes of each said component signals individually with the amplitudes of component signals in the ones of said channels adjacent thereto for determining the ones of said component signals of higher amplitude than the average amplitude of the component signals in said adjacent channels, input and output connections in said last named means, said input connections being coupled to different ones of said frequency selective networks, said output connections being coupled to different ones of said wiper arms, and means for applying said reproduced signals simultaneously to said frequency selective network in each of said channels.

8. In apparatus for analyzing sound having means for determining the amplitude and frequency characteristics of said sound which provides output signals, a system for determining said amplitude and frequency characteristics in terms of time which comprises means for determining the duration of a passage of sound to be analyzed, means for establishing a program of discrete times for the duration of said passage, means for delaying said sound for a period at least as long as the duration of said passage, means for applying said delayed sound to said means for determining said amplitude and frequency characteristics, and means for testing said means for determining the amplitude and frequency characteristics for deriving said output signals in accordance with the established program of discrete times.

9. Apparatus for acoustical analysis of sounds which are separated by pauses which comprises first sound responsive means for performing an acoustical analysis operation comprising determining the length of time between said pauses, second sound responsive means for performing another acoustical analysis dependent upon said first acoustical analysis comprising determining the relative amplitudes of frequency components of said sounds between pauses, said second sound analyzing means including means for selecting and indicating only those frequency components of peak amplitudes which are adjacent components of lesser amplitudes, and means for storing said sound for a given, invariable period of time between said first and said second acoustical analysis.

10. Acoustical analysis apparatus which comprises means for analyzing sound in terms of the amplitude and frequency components thereof, means for analyzing said sound in terms of variations in amplitude of said components with time, said second mentioned analyzing means for selecting and indicating only those frequency components of peak amplitudes which are adjacent frequency components of lesser amplitudes, pre-analyzing means for determining the duration of passages of said sound and for controlling said last-named means, and means for storing said sound for a given invariable period between analysis in said pre-analyzing means and analysis in said first named analyzing means.

11. Acoustic apparatus for analyzing sound which comprises means for simultaneously recording said sound and applying said sound to a controlling device, means for reproducing said recorded sound after a given period, means for determining given characteristics of said sound operative upon said reproduced sound, said last mentioned means including means for selecting and indicating only those frequency components of peak amplitude which are adjacent frequency components of lesser amplitude, and means responsive to said controlling device for indicating the variations in said peak amplitudes with time.

12. Apparatus for analyzing sound syllables having frequency components which comprises means for transporting an endless loop magnetic record, means for recording on said loop the sound to be analyzed, means for reproducing from said loop, at a point spaced from said recording means, the sound recorded on said loop, means operated by said sound during recording thereof for measuring the duration of a syllable, and means independent of the frequency components of said syllable and responsive to said syllable duration measuring means to divide said syllable duration into a predetermined number of discrete time intervals, said predetermined number being independent of the duration of said syllables.

13. Apparatus for analyzing speech sounds in terms of the amplitude-frequency-time characteristics thereof which comprises amplitude-frequency analyzing means for separating said sounds into a plurality of components in different frequency bands, means for sampling said components at a plurality at discrete times, means responsive to each spoken syllable as a function of the duration thereof for controlling said sampling means and establishing said discrete times at equal intervals during continuance of each said syllable, and means for delaying the application of said sound to said amplitude-frequency analyzing means for at least the duration of the respective said syllables while said intervals are being established.

14. Apparatus for analyzing the sound of speech syllables having frequency components which comprises a pair of speech syllable responsive means for determining the presence of components of said syllables at discrete times, and means responsive to said speech syllables as a function of the duration thereof for alternately operating different ones of said pair of determining means to respond to successive ones of said syllables independently of the frequency components of said syllables, said last named means including means for controlling said determining means to operate at said discrete times separated by equal intervals for the duration of said speech syllables.

15. Apparatus for analyzing the sound of speech syllables which comprises means responsive to speech sounds for separating said sounds into components, means for storing said components, first means for successively applying said components to said storing means, second means for successively applying said components to said storing means, first means responsive to a first speech syllable as a function of the duration thereof for operating said first applying means at a plurality of discrete times, and second means responsive to a syllable next occurring after said first syllable and as a function of the duration of said next occurring syllable for operating said second applying means at a plurality of discrete times.

16. Apparatus for analyzing sound which comprises means for analyzing said sound in terms of the amplitude and frequency characteristics thereof at discrete time intervals during passages of said sound, means for adjusting the amplitude of said sound so that each of said passages is of a certain amplitude, means responsive to said sound for determining said discrete time intervals independently of the frequency characteristics of said sound, and means for controlling said amplitude adjusting means operative during each of said sound passages and prior to analysis thereof by said analyzing means.

17. Acoustic apparatus for analyzing sounds in terms of the amplitude and frequency components thereof as such components vary with time which comprises means responsive to said sounds for determining the duration of passages of said sounds, means for establishing a program of discrete times for each of said passages, means responsive to said sounds for determining the amplitude thereof, means for delaying said sounds for a given period longer than any individual one of said passages, means responsive to said amplitude determining means for adjusting the amplitude of each of said passages after delay of said sounds to be a certain amplitude, means responsive to the delayed and amplitude adjusted sounds for separating said sounds into different frequency components, and means for detecting at discrete times certain of said components which have predetermined amplitude relations with respect to other of said components and which are adjacent thereto in frequency.

18. Apparatus for analyzing sounds in terms of the amplitude and frequency components thereof as such components vary with time which comprises means for recording said sounds, means for reproducing said recorded sounds after a given time interval at least as long as the duration of individual passages of said sound, means for adjusting the amplitude of said reproduced sounds, means for separating said reproduced sounds into a plurality of components each within a different frequency band, means responsive to the amplitude of those of said components which are within adjacent frequency bands for selecting the ones of said components which have a certain amplitude relation with respect to others of said components in said adjacent frequency bands, means for testing said frequency bands to detect said ones of said components, means responsive to said sounds while said sounds are being recorded for determining the duration of individual ones of said passages, means also responsive to said sounds as said sounds are being recorded for operating said amplitude adjusting means to adjust the amplitude of each of said passages to be a certain amplitude, and means operated by said duration determining means for operating said testing means at discrete times spaced by given intervals for the duration of individual ones of said passages.

19. Apparatus for analyzing speech sounds in terms of the amplitude-frequency-time characteristics thereof which comprises means for separating said sounds into a plurality of components in different frequency bands, means for sampling said components at a plurality of discrete times during the interval of each syllable of said sounds, means responsive to each spoken syllable as a function of the duration thereof for controlling said sampling means and establishing said times during the continuance of each said syllable, means responsive to each spoken syllable as a function of the amplitude thereof for adjusting the amplitude of each spoken syllable, and means for delaying the application of said sounds to said analyzing means for at least the duration of the respective said syllables while said intervals are being established and while said amplitude adjusting means is operated.

References Cited in the file of this patent

UNITED STATES PATENTS

| | | |
|---|---|---|
| 2,171,671 | Percival | Sept. 5, 1939 |
| 2,181,265 | Dudley | Nov. 28, 1939 |
| 2,341,336 | Singer | Feb. 8, 1944 |
| 2,378,388 | Begun | June 19, 1945 |
| 2,421,424 | Kreuzer | June 3, 1947 |
| 2,521,623 | Arndt et al. | Sept. 5, 1950 |
| 2,646,465 | Davis et al. | July 21, 1953 |
| 2,673,893 | Kalfaian | Mar. 30, 1954 |
| 2,685,615 | Biddulph et al. | Aug. 3, 1954 |
| 2,921,133 | Kalfaian | Jan. 12, 1960 |
| 2,938,079 | Flanagan | May 24, 1960 |
| 2,958,729 | Licklider | Nov. 1, 1960 |
| 2,996,579 | Slaymaker | Aug. 15, 1961 |
| 2,997,668 | Nolle | Aug. 15, 1961 |
| 3,051,897 | Peterson et al. | Aug. 28, 1962 |

UNITED STATES PATENT OFFICE
CERTIFICATE OF CORRECTION

Patent No. 3,172,954 March 9, 1965

Herbert Belar et al.

It is hereby certified that error appears in the above numbered patent requiring correction and that the said Letters Patent should read as corrected below.

Column 4, line 66, for "order" read -- other --; column 19, line 32, after "amplifier" insert -- 464 --; column 21, line 44, after "means" insert -- including means --.

Signed and sealed this 24th day of August 1965.

(SEAL)
Attest:

ERNEST W. SWIDER
Attesting Officer

EDWARD J. BRENNER
Commissioner of Patents